(12) United States Patent
Ishihara et al.

(10) Patent No.: US 9,387,973 B2
(45) Date of Patent: *Jul. 12, 2016

(54) OXYGEN ABSORBING AGENT

(71) Applicant: MITSUBISHI GAS CHEMICAL COMPANY, INC., Tokyo (JP)

(72) Inventors: Emi Ishihara, Tokyo (JP); Hirokazu Tanaka, Tokyo (JP); Tatsuo Iwai, Ibaraki-ken (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/371,608

(22) PCT Filed: Aug. 7, 2013

(86) PCT No.: PCT/JP2013/071334
§ 371 (c)(1),
(2) Date: Jul. 10, 2014

(87) PCT Pub. No.: WO2014/024911
PCT Pub. Date: Feb. 13, 2014

(65) Prior Publication Data
US 2014/0336047 A1    Nov. 13, 2014

(30) Foreign Application Priority Data

Aug. 8, 2012 (JP) .............................. 2012-176306

(51) Int. Cl.

| | |
|---|---|
| B65D 81/26 | (2006.01) |
| A23L 3/3436 | (2006.01) |
| B01J 20/02 | (2006.01) |
| B01J 20/28 | (2006.01) |
| B01D 53/02 | (2006.01) |
| C22C 1/04 | (2006.01) |
| C22C 1/08 | (2006.01) |
| C22C 33/02 | (2006.01) |
| B01J 20/30 | (2006.01) |
| B22F 1/00 | (2006.01) |
| B22F 3/24 | (2006.01) |

(52) U.S. Cl.
CPC ............. *B65D 81/267* (2013.01); *A23L 3/3436* (2013.01); *B01D 53/02* (2013.01); *B01J 20/02* (2013.01); *B01J 20/28011* (2013.01); *B01J 20/28026* (2013.01); *B01J 20/3071* (2013.01); *B22F 1/0081* (2013.01); *B65D 81/266* (2013.01); *C22C 1/0416* (2013.01); *C22C 1/08* (2013.01); *C22C 33/02* (2013.01); *B01D 2253/1122* (2013.01); *B01D 2255/2092* (2013.01); *B01D 2255/20738* (2013.01); *B01D 2255/20746* (2013.01); *B01D 2255/20753* (2013.01); *B01D 2255/20761* (2013.01); *B01D 2257/104* (2013.01); *B22F 1/0088* (2013.01); *B22F 2003/244* (2013.01)

(58) Field of Classification Search
CPC ............ C22B 23/0415; B22F 2998/00; B65D 81/267; B01J 20/02
USPC ........................................................ 206/204
See application file for complete search history.

(56) References Cited

U.S. PATENT DOCUMENTS

| | | | |
|---|---|---|---|
| 5,908,676 A | 6/1999 | Otaki et al. | |
| 2009/0158890 A1* | 6/2009 | Garbar .................. | B22F 1/0018 75/332 |
| 2013/0209350 A1 | 8/2013 | Ishihara et al. | |
| 2014/0291178 A1 | 10/2014 | Masuda et al. | |

FOREIGN PATENT DOCUMENTS

| | | |
|---|---|---|
| CN | 1088270 | 6/1994 |
| CN | 101531726 | 9/2009 |
| EP | 0761348 | 3/1997 |
| EP | 2606959 | 6/2013 |
| EP | 2881172 | 6/2015 |
| JP | 54-099092 | 8/1979 |
| JP | 62-277148 | 12/1987 |
| JP | 09-253481 | 9/1997 |
| JP | 09253481 A * | 9/1997 |
| JP | 2005-104064 | 4/2005 |
| JP | 2006-263630 | 10/2006 |
| JP | 2007-185653 | 7/2007 |
| JP | 5246384 | 7/2013 |
| KR | 10-2010-0112587 | 10/2010 |
| TW | 460385 | 10/2001 |
| WO | 2004/000491 | 12/2003 |

OTHER PUBLICATIONS

Search report from International Search Report in PCT/JP2013/071334, mailed Oct. 8, 2013., mail date is Oct. 8, 2013.
International Preliminary Report on Patentability in PCT/JP2013/071334, issued Feb. 10, 2015.
Extended European Search Report in respect to European Application No. 13827730.6, dated Mar. 2, 2016.

* cited by examiner

*Primary Examiner* — Weiping Zhu
(74) *Attorney, Agent, or Firm* — Greenblum & Bernstein, P.L.C.

(57) ABSTRACT

An oxygen absorbing agent has excellent oxygen absorbing properties and can absorb oxygen in an atmosphere, even under a moisture-free or substantially moisture-free atmosphere. The oxygen absorbing agent includes an alloy obtained by subjecting an alloy (X) including (A) at least one transition metal selected from the group consisting of manganese, iron, platinum, and copper group metals and (B) at least one metal selected from the group consisting of aluminum, zinc, tin, lead, magnesium, and silicon, to treatment with an alkali aqueous solution to elute and remove at least a part of the component (B) in the alloy (X), wherein the alloy (Y) has an X-ray diffraction profile satisfying a diffraction peak relationship.

13 Claims, 1 Drawing Sheet

OXYGEN ABSORBING AGENT

TECHNICAL FIELD

The present invention relates to an oxygen absorbing agent. More specifically, the present invention relates to an oxygen absorbing agent that has excellent oxygen absorbing properties and can absorb and remove oxygen even in a low-humidity atmosphere.

BACKGROUND ART

One of techniques for preserving foods, pharmaceutical products and the like is preservation utilizing oxygen absorbing agents (oxygen scavengers). Specifically, the preservation utilizing oxygen absorbing agents is a technique in which an oxygen scavenger capable of absorbing oxygen in atmosphere, together with an object, is placed within a hermetically sealable packaging body, and the inside of the hermetically sealable packaging body is brought to an oxygen-free state to prevent an oxidation-derived deterioration, a fungal deterioration, discoloration and the like of objects.

Oxygen scavengers formed of various inorganic materials and oxygen scavengers formed of various organic materials have hitherto been proposed for the removal of oxygen in atmosphere. Examples thereof include oxygen scavengers comprising inorganic main agents, for example, iron or other metal powders, sulfites, bisulfites, and dithionite, and oxygen scavengers comprising organic main agents, for example, L-ascorbic acid, erythorbic acid and salts thereof, saccharides such as glucose, and reducing polyhydric alcohols such as cathecol and pyrogallol.

These conventional oxygen scavengers, however, suffer from a problem that, in use, when a material that can supply water or moisture does not exist, an oxygen scavenging capability high enough to be used for practical use cannot be provided. Specifically, in conventional oxygen scavengers, an oxygen scavenging capability high enough to be used for practical use cannot be provided without mixing of the material with water or moisture retained thereon, for example, compounds containing water of crystallization, in use, or utilization of water vapor released from foods or the like to be preserved. Accordingly, difficulties have been encountered in applying conventional oxygen scavengers to pharmaceutical products or dried foods that should be used or preserved under drying conditions, or to storage of metal products that are weak against water or moisture without rusting.

Accordingly, oxygen absorbing agents that do not require moisture in oxygen absorption have been demanded in these applications. Oxygen absorbing agents reported as meeting this demand include, for example, oxygen scavengers comprising cerium oxide utilizing oxygen defects as a main agent (Japanese Patent Application Laid-Open No. 185653/2007), oxygen scavengers comprising titanium oxide containing oxygen defects as a main agent (Japanese Patent Application Laid-Open No. 104064/2005), oxygen scavengers comprising a metal subjected to hydrogen reduction as a main agent (Japanese Patent Application Laid-Open No. 277148/1987), and oxygen scavengers that utilize autoxidation of organic substances.

Among the above oxygen scavengers, oxygen scavengers disclosed in Japanese Patent Application Laid-Open No. 185653/2007 and Japanese Patent Application Laid-Open No. 104064/2005 utilize rare metals as starting metals that are rare and expensive. Further, the rare metals should be obtained through import from foreign countries, and, thus, depending upon further situation development, there is a possibility that the purchase of stock is varied, making it impossible to provide stable amount of production. Accordingly, these oxygen scavengers are not always satisfactory from the viewpoints of cost and stable supply of the rare metals. The oxygen scavenger disclosed in Japanese Patent Application Laid-Open No. 277148/1987 requires the provision of a large hydrogen reduction equipment in the production thereof and thus cannot be simply produced and, at the same time, cannot be said to have good handleability in the atmosphere. Furthermore, the oxygen scavenger utilizing autoxidization of the organic substance utilizes an oxidation reaction of the organic substance as the main agent, posing a problem of a by-product produced after oxygen absorption.

Accordingly, there is still a demand for an oxygen absorbing agent that can absorb oxygen in the atmosphere even in a moisture-free or substantially moisture-free atmosphere, is advantageous in stable availability of starting materials at low cost, is substantially free from the problem of the by-product, and is not necessary to provide a large apparatus for hydrogen reduction as an incidental equipment.

PRIOR ART DOCUMENTS

Patent Documents

Patent document 1: Japanese Patent Application Laid-Open No. 185653/2007
Patent document 2: Japanese Patent Application Laid-Open No. 104064/2005
Patent document 3: Japanese Patent Application Laid-Open No. 277148/1987

SUMMARY OF THE INVENTION

Problems to be Solved by the Invention

The present inventors have found that a metal obtained by removing only aluminum from an alloy composed of aluminum and iron or an alloy composed of aluminum and nickel with an aqueous sodium hydroxide solution can absorb and remove oxygen in an atmosphere, even in a moisture-free or substantially moisture-free atmosphere having a relative humidity RH of 30% (25° C.) or less, on the same level as attained by conventional oxygen scavengers and can be produced in a simple and cost-effective manner without use of a large-size apparatus that is required, for example, for hydrogen reduction, and further that the use of this metal as oxygen scavengers can realize the absorption of oxygen even in a moisture-free or substantially moisture-free atmosphere.

However, it has been found that a specific metal hydroxide is disadvantageously formed by a reaction of aluminum with sodium hydroxide in the elution of aluminum in the production of the oxygen absorbing agent and affects oxygen absorbing properties of the oxygen absorbing agent. Further, the present inventors have found that the removal of the metal hydroxide from the metal with aluminum eluted therefrom can contribute to dramatically improved oxygen absorbing properties. The present invention has been made based on such finding.

Thus, an object of the present invention is to provide an oxygen absorbing agent that has excellent oxygen absorbing properties and can absorb oxygen in an atmosphere, even under a moisture-free or substantially moisture-free atmosphere.

Means for Solving the Problems

According to one aspect of the present invention, there is provided an oxygen absorbing agent comprising an alloy (Y), the alloy (Y) having been obtained by subjecting an alloy (X) comprising (A) at least one transition metal selected from the group consisting of manganese, iron, platinum, and copper group metals and (B) at least one metal selected from the group consisting of aluminum, zinc, tin, lead, magnesium, and silicon to treatment with an acid or an alkali aqueous solution to elute and remove at least a part of the component (B) in the alloy (X), wherein the alloy (Y) has an X-ray diffraction profile satisfying a diffraction peak relationship of $S_2/S_1 < 0.3$ wherein $S_1$ represents a diffraction peak area defined by $S_1 = W_1 \times I_1$ and $S_2$ represents a diffraction peak area defined by $S_2 = W_2 \times I_2$, wherein $W_1$ represents a half value width of a diffraction peak derived from the component (A) and/or a solid solution composed of the components (A) and (B) and $I_1$ represents a diffraction intensity of the diffraction peak; wherein $W_2$ represents a half value width of a diffraction peak at a diffraction angle $2\theta$ of 10 to 11° and $I_2$ represents a diffraction intensity of the diffraction peak.

In an embodiment of the present invention, the alloy (Y) has an X-ray diffraction profile satisfying a diffraction peak relationship of $S_3/S_1 < 0.3$ wherein $S_3$ represents a diffraction peak area defined by $S_3 = W_3 \times I_3$ wherein $W_3$ represents a half value width of a diffraction peak at a diffraction angle $2\theta$ of 23 to 25° and $I_3$ represents a diffraction intensity of the diffraction peak.

In an embodiment of the present invention, the alloy (Y) is substantially free from a metal hydroxide that is a hydroxide of the metal as the component (B).

In an embodiment of the present invention, the alloy (Y) obtained by eluting and removing at least a part of the component (B) has a porous shape.

In an embodiment of the present invention, the component (A) is selected from the group consisting of iron, cobalt, nickel, and copper.

In an embodiment of the present invention, the component (B) is aluminum.

In an embodiment of the present invention, the content of the component (B) in the alloy (Y) obtained by eluting and removing at least a part of the component (B) is 0.01 to 50% by weight.

In an embodiment of the present invention, the powdery alloy (Y) has been obtained by treating a powder of the alloy (X) comprising the component (A) and the component (B) with the acid or the alkali aqueous solution to elute and remove at least a part of the component (B).

In an embodiment of the present invention, the alkali aqueous solution is an aqueous solution of sodium hydroxide or potassium hydroxide.

In an embodiment of the present invention, the alloy (Y) obtained by eluting and removing at least a part of the component (B) has a specific surface area of at least 40 $m^2/g$ as measured by a BET method.

In an embodiment of the present invention, the oxygen absorbing agent has been obtained by treating the alloy (Y) with an additional acid or alkali aqueous solution having a higher concentration than the acid or alkali aqueous solution, and eluting and removing at least a part of the component (B) in the alloy (Y).

According to another aspects of the present invention, there are provided an oxygen absorbing packaged body comprising the above oxygen absorbing agent; and a packaging material, the whole or a part of which is formed of an air-permeable packaging material, the oxygen absorbing agent having been packaged into the packaging material, and an oxygen absorbing resin composition comprising the above oxygen absorbing agent and a thermoplastic resin.

According to a further aspect of the present invention, there is provided an oxygen absorbing resin sheet or film comprising the above oxygen absorbing resin composition.

Effect of the Invention

According to the present invention, when an alloy (Y) obtained by removing a part of the component (B) from the alloy (X) containing the specific components (A) and (B) is used as an oxygen absorbing agent, oxygen in an atmosphere, even in a moisture-free or substantially moisture-free atmosphere, can be absorbed and removed on the same level as attained by conventional oxygen scavengers. Accordingly, the oxygen absorbing agent is suitable, for example, for applications, to which conventional oxygen scavengers cannot be applied without difficulties, that is, for applications where an atmosphere in dried foods, pharmaceutical products, and packages of electronic materials that are weak against moisture is brought to an oxygen-free state.

The oxygen absorbing agent according to the present invention can realize excellent oxygen absorbing properties, because the alloy (Y) obtained by eluting the component (B) has an X-ray diffraction profile satisfying a diffraction peak relationship of $S_2/S_1 < 0.3$ wherein $S_1$ represents an area of a diffraction peak derived from the component (A) and/or a solid solution composed of the components (A) and (B) and $S_2$ represents an area of a diffraction peak derived from a specific impurity, and the content of a specific impurity such as a metal hydroxide contained in the alloy (Y) has been reduced.

MODE FOR CARRYING OUT THE INVENTION

<Oxygen Absorbing Agent>

Figure 1:
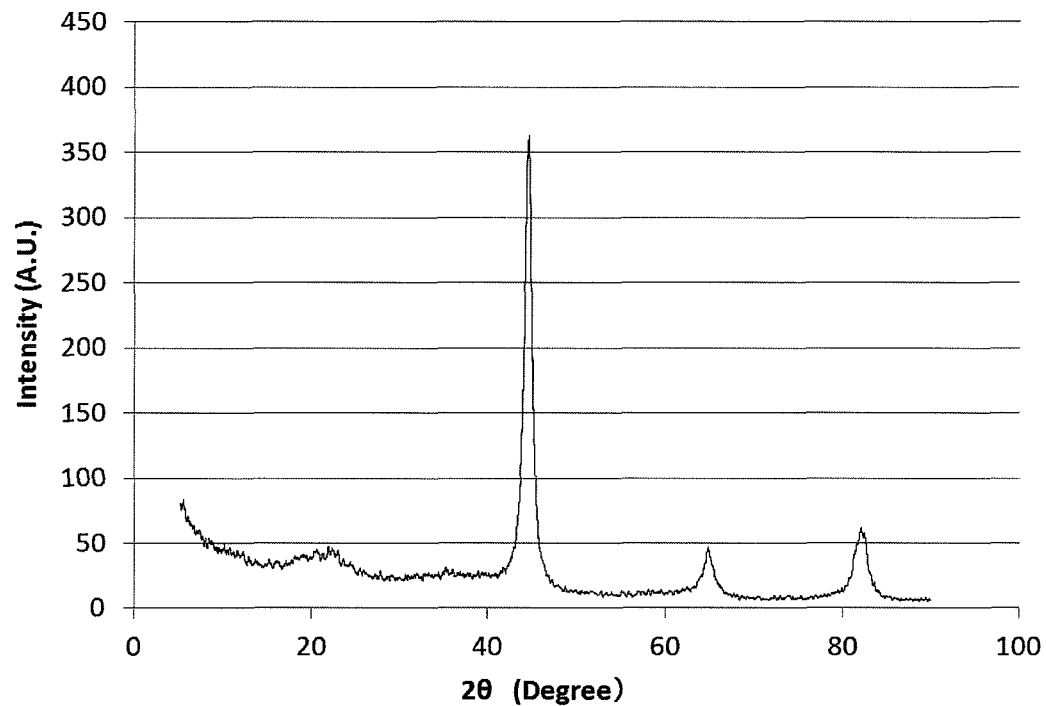
FIG. 1 is a diagram showing an X-ray diffraction pattern of an Al—Fe alloy powder obtained in Example 1.

The oxygen absorbing agent according to the present invention contains an alloy (Y) obtained by subjecting an alloy (X) comprising specific two components, that is, (A) at least one transition metal selected from the group consisting of manganese, iron, platinum, and copper group metals and (B) at least one metal selected from the group consisting of aluminum, zinc, tin, lead, magnesium, and silicon, to treatment with an acid or an alkali aqueous solution to elute and remove at least a part of the component (B) in the alloy (X). The alloy (Y) has an X-ray diffraction profile satisfying a diffraction peak relationship of $S_2/S_1 < 0.3$ wherein $S_1$ represents a diffraction peak area defined by $S_1 = W_1 \times I_1$ and $S_2$ represents a diffraction peak area defined by $S_2 = W_2 \times I_2$, wherein $W_1$ represents a half value width of a diffraction peak derived from the component (A) and/or a solid solution composed of the components (A) and (B) and $I_1$ represents a diffraction intensity of the diffraction peak; wherein $W_2$ represents a half value width of a diffraction peak at a diffraction angle $2\theta$ of 10 to 11° and $I_2$ represents a diffraction intensity of the diffraction peak. The term "oxygen absorbing agent" as used herein refers to an agent that can selectively absorb oxygen from an atmosphere around a place where the agent has been installed. The term "half value width" refers to a diffraction angle width (2θ) at which the diffraction intently is ½ wherein I represents the intensity of an X-ray diffraction peak.

<Component (A)>

The transition metal usable as the component (A) constituting the oxygen absorbing agent is selected from manganese group metals (manganese, technetium, and rhenium), iron group metals (iron, cobalt, and nickel), platinum group metals (ruthenium, rhodium, palladium, osmium, iridium, and platinum), and copper group metals (copper, silver, and gold). The transition metals may be used either solely or in a combination of two or more of them. For example, when iron and nickel are selected, an Fe—Ni alloy may be used as the component (A).

The component (A) is preferably manganese, iron, cobalt, nickel, or copper, more preferably iron, cobalt, nickel, or copper, still more preferably iron or nickel, particularly preferably iron. Among them, iron is preferred because of high safety and low cost.

<Component (B)>

The component (B) constituting the oxygen absorbing agent is selected from aluminum, zinc, tin, lead, magnesium, and silicon. They may be used either solely or in a combination of two or more of them. The component (B) is, among the metals exemplified as the component (B), preferably a metal selected from aluminum, zinc, magnesium, and silicon, more preferably aluminum, zinc, magnesium, or silicon, still more preferably aluminum. Among them, aluminum is preferred because of low cost.

In the preparation of the oxygen absorbing agent according to the present invention, an alloy (X) comprising the component (A) and the component (B) is prepared. Molybdenum, chromium, titanium, vanadium, tungsten and the like may be further added as additive metals to the alloy (X). The alloy (X) may further comprise additive components such as cyanic acids.

The alloy (X) comprising the component (A) and the component (B) may be prepared by a melting method. Regarding the composition ratio of the component (A) and the component (B), preferably, when the proportion of the component (A) is 20 to 80% by weight, the proportion of the component (B) is 80 to 20% by weight. More preferably, when the proportion of the component (A) is 30 to 70% by weight, the proportion of the component (B) is 70 to 30% by weight. More specifically, for example, when the component (A) and the component (B) are iron or nickel and aluminum, respectively, preferably, the proportion of iron or nickel is 30 to 55% by weight while the proportion of aluminum is 45 to 70% by weight.

The alloy (X) as such may be subjected to treatment with an acidic or alkaline aqueous solution. In general, the alloy is finely ground before the treatment with the acidic or alkaline aqueous solution. The term "alloy" as used herein refers to an alloy having a single composition that has a specific crystal structure, as well as an alloy mixture or a mixture of metals per se.

The alloy (X) may be finely ground by a method properly selected from commonly used metal crushing/grinding methods. An example of the finely grinding method is one in which the alloy is ground by a jaw crusher, a roll crusher, a hammer mill or the like, and, if necessary, fine grinding with a ball mill is further performed. Alternatively, a method may also be adopted in which a molten metal of the alloy is finely ground by rapid solidification such as atomization. When atomization is adopted, fine grinding in an inert gas such as an argon gas is preferred. The atomization may be performed by a method described, for example, in Japanese Patent Application Laid-Open No. 23597/1993.

The particle diameter of the alloy powder is preferably in the range of 5 to 200 μm. The particle size distribution is preferably as narrow as possible. Sieving (classification) with commercially available mesh sieves (for example, 200-mesh sieves) may be properly performed from the viewpoints of removing large particles and providing uniform particle size distribution. The atomization is likely to provide near spherical powder particles and, at the same time, to provide a narrow particle size distribution.

The alloy (X) or alloy (X) powder thus obtained is treated with an acidic or alkaline aqueous solution to elute and remove at least a part of the component (B). That is, a alloy (Y) obtained by eluting and removing at least a part of the component (B) from the alloy (X) is used as the oxygen absorbing agent in the present invention. The acidic or alkaline aqueous solution is not particularly limited as long as the acidic or alkaline aqueous solution is one that does not dissolve or hardly dissolves the component (A), but on the other hand, the component (B) is mainly dissolved therein, and one that dissolves both the components (A) and (B) with the dissolution speed of the component (B) being higher than that of the component (A). Examples of acids usable in the acidic aqueous solution include hydrochloric acid, sulfuric acid, and nitric acid. Examples of alkalis usable in the alkaline aqueous solution include sodium hydroxide, potassium hydroxide, calcium hydroxide, tetramethylammonium hydroxide (TMAH), $Na_2CO_3$, $K_2CO_3$, and ammonia. In the acidic or alkaline aqueous solution, a combination of two or more of the acids or a combination of two or more of the alkalis may if necessary be used.

In a preferred embodiment of the present invention, the acidic or alkaline aqueous solution is preferably an alkaline aqueous solution, more preferably an aqueous solution of sodium hydroxide or potassium hydroxide. For example, when aluminum is used as the component (B), the use of an aqueous sodium hydroxide solution as the alkaline aqueous solution is advantageous in that the removal of excess sodium hydroxide by water washing and the removal of eluted aluminum are easy and, thus, the effect of reducing the necessary times of water washing can be expected.

In the treatment with the acidic or alkaline aqueous solution, for alloy powder, it is common practice to introduce the alloy powder little by little into an acidic or alkaline aqueous solution with stirring. Alternatively, a method may be adopted in which the alloy powder is previously placed in water and a concentrated acid or alkali is added dropwise to the water containing the alloy powder.

The elution of the component (B) from the alloy (X) with an acid or an alkali aqueous solution by the above method sometimes suffers from disadvantages such as the formation of a passive film on the surface of the alloy (Y) as a result of passivation of a part of the metal as the component (B), and pores in the alloy (Y) that has been rendered porous by the elution of the component (B) by a method which will be described later are disadvantageously clogged by the passivated metal compound. As a result, the alloy (Y), that is, the oxygen absorbing agent, sometimes has lowered oxygen absorbing properties.

For example, when the component (B) is aluminum, a metal hydroxide ($Al(OH)_3$) is produced by eluting aluminum from the alloy (X) with an aqueous sodium hydroxide solution. In this case, the alloy (Y) obtained by eluting aluminum has an X-ray diffraction profile including a diffraction peak derived from the component (A) and/or a solid solution composed of the components (A) and (B) and, in some cases, additional diffraction peaks derived from impurities such as metal hydroxides (diffraction angle 2θ=10 to 11° and 2θ=23 to 25°). In the present invention, the alloy (Y) has an X-ray diffraction profile satisfying a diffraction peak relationship of $S_2/S_1<0.3$ wherein $S_1$ represents a diffraction peak area defined by $S_1=W_1 \times I_1$ and $S_2$ represents a diffraction peak area defined by $S_2=W_2 \times I_2$, wherein $W_1$ represents a half value width of a diffraction peak derived from the component (A) and/or a solid solution composed of the components (A) and (B) and $I_1$ represents a diffraction intensity of the diffraction peak; wherein $W_2$ represents a half value width of a diffraction peak at a diffraction angle 2θ of 10 to 11° and $I_2$ represents a diffraction intensity of the diffraction peak. In the alloy (Y), when the area ($S_1$) of the diffraction peak derived from the alloy (Y) and the area ($S_2$) of the diffraction peak derived from the impurity satisfy the above relationship, an oxygen absorbing agent having better oxygen absorbing properties can be realized. It is considered that the content of the impurity in the alloy (Y) decreases with reducing the ratio of the area ($S_2$) of the diffraction peak derived from the impurity to the area ($S_1$) of the diffraction peak derived from the alloy (Y), that is, $S_2/S_1$. In the present invention, the value of $S_2/S_1$ is preferably less than 0.1, more preferably less than 0.01, particularly preferably a negligible small value (that is, $S_2=0$).

Further, in the present invention, the alloy (Y) preferably has an X-ray diffraction profile satisfying a diffraction peak relationship of $S_3/S_1<0.3$ wherein $S_3$ represents a diffraction peak area defined by $S_3=W_3 \times I_3$ wherein $W_3$ represents a half value width of a diffraction peak at a diffraction angle 2θ of 23 to 25° and $I_3$ represents a diffraction intensity of the diffraction peak. When the area ($S_1$) of the diffraction peak derived from the alloy (Y) and the area ($S_3$) of the diffraction peak derived from the impurity satisfy the above relationship, an oxygen absorbing agent having better oxygen absorbing properties can be realized. It is considered that the content of the impurity in the alloy (Y) decreases with reducing the ratio of the area ($S_3$) of the diffraction peak derived from the impurity to the area ($S_1$) of the diffraction peak derived from the alloy (Y), that is, $S_3/S_1$. The value of $S_3/S_1$ is preferably less than 0.1, more preferably less than 0.01, particularly preferably a negligible small value (that is, $S_3=0$).

The alloy (Y) satisfying the above relationship of the diffraction peak areas $S_1$, $S_2$, and $S_3$ can be obtained by removing impurities such as metal hydroxides from the alloy (Y). The present inventors have found that the oxygen absorbing properties of the oxygen absorbing agent can be dramatically improved by removing impurities such as metal hydroxides from the alloy (Y). The metal hydroxide can be removed from the alloy (Y) by eluting the component (B) from the alloy (X) and then washing the resultant alloy (Y) with an aqueous acid or alkali solution having a high concentration.

While there is no intention of being bound by any particular theory, it is believed that, for example, when washing with an aqueous sodium hydroxide solution is carried out, the metal hydroxide produced in the elution of aluminum is removed by the following reaction.

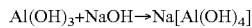

Specifically, a metal hydroxide adhered to the surface of or pores of the alloy (Y) can be removed by converting the metal hydroxide to a metal hydroxide complex such as an aluminate, and, thus, an alloy (Y) substantially free from impurities such as metal hydroxides can be obtained. In the X-ray diffraction profile of the alloy (Y) thus obtained, diffraction peaks derived from impurities such as metal hydroxides (diffraction angles 2θ=10 to 11° and 2θ=23 to 25°) have a reduced intensity and sometimes disappear. The expression "substantially free from" as used herein means that the alloy (Y) does not contain impurities such as metal hydroxides on such a level that diffraction peaks derived from impurities are not detected (that is, $S_2$ and/or $S_3$ are zero (0)).

An aqueous sodium hydroxide solution or an aqueous potassium hydroxide solution may be used as a highly concentrated alkali to remove metal hydroxides from the alloy (Y). The metal hydroxide may be removed after the step of elution of the component (B). Alternatively, when the component (B) is eluted with an aqueous sodium hydroxide solution or an aqueous potassium hydroxide solution, the elution of the component (B) and the removal of the metal hydroxide may be simultaneously carried out with an aqueous solution having a high concentration. For example, since the following elution equilibrium is established between aluminum hydroxide ($Al(OH)_3$) and sodium aluminate ($Na[Al(OH)_4]$), aluminum hydroxide can be efficiently removed with a high-temperature aqueous alkali solution having a high concentration.

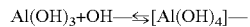

In the treatment with the acidic or alkaline aqueous solution, the concentration of the acidic or alkaline aqueous solution is, for example, 5 to 60% by weight. More specifically, when sodium hydroxide is used, the concentration is preferably 10 to 40% by weight.

In the treatment with the acidic or alkaline aqueous solution, the temperature of the aqueous solution is, for example, preferably approximately 20 to 120° C., more preferably 25 to 100° C.

The treatment time for the treatment of the alloy or alloy powder with the acidic or alkaline aqueous solution may vary depending, for example, upon the shape, state, and amount of the alloy used, the concentration of the acidic or alkaline aqueous solution, and the temperature of the treatment but is generally approximately 30 to 300 min. The amount of the component (B) eluted from the alloy may be regulated by regulating the treatment time.

In the present invention, at least a part of the component (B) is eluted and removed from the alloy (X) by the treatment with the acidic or alkaline aqueous solution. Here eluting and removing "at least a part of the component (B)" means the elution and removal of a part of the component (B) from the alloy (X) comprising the component (A) and the component (B), as well as the elution and removal of the whole component (B) from the alloy (X) comprising the component (A) and the component (B). Thus, in the present invention, the "alloy (Y)" is a concept including a metal obtained by eluting the whole of the component (B) (that is, a metal consisting of the component (A) alone). It cannot be denied that there is possibility that, in the process of eluting the component (B), a part of the component (A) is dissolved in the acidic or alkaline aqueous solution. Accordingly, "at least a part of the component (B)" is not limited to the elution of only the component (B) by the treatment with the acidic or alkaline aqueous solution.

At least a part, preferably a large proportion, of the component (B) (for example, aluminum) is eluted from the alloy (X) by the treatment with the acidic or alkaline aqueous solution. The proportion of the elution of the component (B) from the alloy (X) can be expressed in terms of the content (on a weight basis) (residual ratio) of the component (B) in the alloy (Y) obtained after the elution and removal.

The content of the component (B) in the metal used as the oxygen absorbing agent (that is, the alloy (Y) after the elution of the component (B)) is preferably 0.01 to 50% by weight, more preferably 0.1 to 40% by weight. More specifically, for example, when the alloy (X) is an Al—Fe alloy, the content of aluminum in the alloy (Y) obtained by eluting and removing aluminum by the treatment with the acidic or alkaline aqueous solution from the alloy is preferably 0.01 to 50% by weight, more preferably 0.1 to 40% by weight, still more preferably 1 to 5% by weight. The content of the component (B) (for example, aluminum) in the alloy (Y) used in the oxygen absorbing agent may be measured, for example, by an ICP method.

The alloy (Y) thus obtained has a porous shape (or a porous body). In particular, as described above, the alloy (Y) obtained by eluting the component (B) from the alloy (X) is substantially free from a metal hydroxide, and, thus, pores formed in the alloy (Y) are not clogged with the metal hydroxide. Here the porous shape refers to such a state that a number of pores having a size identifiable under an electron microscope are present on the surface of or within the alloy (Y). In the present invention, the porosity of the metal can be expressed in terms of specific surface area. Specifically, the specific surface area of the metal used in the oxygen absorbing agent according to the present invention is at least 10 $m^2/g$, preferably at least 20 $m^2/g$, more preferably at least 40 $m^2/g$, still more preferably at least 100 $m^2/g$, as measured by a BET method.

For example, in the present invention, when iron and aluminum are used as the component (A) and the component (B), respectively, the specific surface area (measured by the BET method) of the resultant porous alloy (Y) is approximately 20 to 40 $m^2/g$, whereas a nonporous conventional iron powder (reduced iron powder or atomized iron powder) has a specific surface area of approximately 0.07 to 0.13 $m^2/g$, demonstrating that the former is porous.

The porosity in the porous shape of the alloy (Y) may also be expressed in terms of bulk density. The bulk density of the alloy (Y) used in the oxygen absorbing agent according to the present invention is not more than 2 $g/cm^3$, preferably not more than 1.5 $g/cm^3$. Incidentally, the nonporous conventional iron powder (reduced iron powder or atomized iron powder) has a bulk density of approximately 2 to 3 $g/cm^3$.

In the present invention, the porous alloy (Y) used in the oxygen absorbing agent has a high level of oxygen absorption activity and thus may also be of course suitable for use as an oxygen absorbing agent even under an atmosphere having a low humidity (for example, 30% RH or less (relative humidity) (25° C.)). It is needless to say that the porous metal is also suitable as oxygen abosrbing agents even under high-humidity conditions (for example, under 100% RH (relative humidity) (25° C.) conditions.

Accordingly, the alloy (Y) obtained as described above can absorb at least 5 mL/g of oxygen, more preferably 10 mL/g of oxygen under an atmosphere having a low humidity of 30% RH or less (relative humidity) (25° C.). When the alloy (Y) is used as the oxygen absorbing agent, the amount of oxygen absorbed is 5 to 150 mL/g under an atmosphere having a low humidity of 30% RH or less (relative humidity) (25° C.).

<Use of Oxygen Absorbing Agent>

When the oxygen absorbing agent formed of the alloy (Y), particularly the alloy (Y), is porous, a deterioration caused by oxidation is likely to occur in the air. Therefore, this alloy (Y) may be used in the form of an oxygen absorbing resin obtained by mixing (kneading) this alloy with a thermoplastic resin. The oxygen absorbing resin after kneading may also be extruded and stretched to form a film or a sheet and to thus obtain an oxygen-absorbable film or sheet.

The type of thermoplastic resins used is not particularly limited, and examples thereof include polyethylene, polypropylene, ethylene-vinyl acetate copolymers, elastomers, or mixtures thereof.

The oxygen absorbing resin may contain additives that are added in resin film or sheet molding, for example, lubricants, crosslinking agents, antioxidants, ultraviolet absorbers, photostabilizers, fillers, reinforcing agents, antistatic agents, and pigments.

The oxygen absorbing agent may be formed into an oxygen absorbing agent packaged body including: the oxygen absorbing agent; and a packaging material, the whole or a part of which is formed of an air-permeable packaging material, the oxygen absorbing agent having been packaged into the packaging material. Examples of such packaging materials include a packaging material prepared by laminating two air-permeable packaging materials and forming a bag from the laminate, a packaging material prepared by laminating one air-permeable packaging material and one air-impermeable packaging material and forming a bag from the laminate, and a packaging material prepared by folding one air-permeable packaging material and mutually sealing edges except for the folded part to form a bag. Packaging materials permeable to oxygen and carbon dioxide are usable as the air-permeable packaging material. Examples of such air-permeable packaging materials include papers, nonwoven fabrics, and conventional plastic films that have been treated to render them permeable to air.

The oxygen absorbing agent according to the present invention can absorb oxygen regardless of water activity and can be applied to a region having high water activity to a region having a low water activity. Further, the oxygen absorbing agent according to the present invention is suitable for commodities that have low water activity and should be stored under low-humidity drying conditions. The water activity refers to a measure of the content of free water in commodities and is expressed by a numeral value of 0 to 1 wherein the water activity of water-free commodities is 0 (zero) and the water activity of pure water is 1. That is, the water activity is defined as follows.

$$Aw=P/P_0=RH/100$$

wherein Aw represents the water activity of a commodity; P represents a water vapor pressure within a space after the commodity is hermetically sealed and is brought to an equilibrium state; $P_0$ represents a water vapor pressure of pure water; and RH represents a relative humidity within the space, %.

In order to store commodities having a low water content that should be stored under low-humidity conditions, the relative humidity (RH) of an atmosphere in which the commodities having a low water content are stored is preferably 20 to 70%, more preferably 20 to 50%. The water content of commodities having a low water content is preferably not more than 50% by weight, more preferably not more than 30% by weight, particularly preferably not more than 10% by weight. Commodities having a low water content (products to be packaged) that should be stored under low-humidity conditions include, for example, foods and pharmaceutical products that are weak against an increase in water content and are required to avoid inclusion of foreign materials, for example, powdery and granular foods (powder soups, powder beverages, powder confectioneries, seasoners, grain powders, nutritional foods, health foods, artificial colors, flavoring agents, and spices and condiments), powdery and granular pharmaceutical products (medicinal powders, powdered soaps, toothpastes, and heavy chemicals), and molded products (tablets) thereof. In particular, when the products to be packaged are filled into oxygen absorbing packaging bodies which will be described later, oxygen in an atmosphere, even in a moisture-free or substantially moisture-free atmosphere, can be absorbed and removed on the same level as that attained by conventional oxygen scavengers. Accordingly, the oxygen absorbing agent is suitable for use in applications where an atmosphere in packages of dried foods, pharmaceutical products, and electronic materials, which are weak against moisture and for which conventional oxygen scavengers cannot be applied, is brought to an oxygen-free state. The oxygen absorbing agent is suitable for use, for example, in dried foods such as powder seasoners, powder coffees, coffee beans, rices, teas, beans, baked rice chips, and rice crackers, pharmaceutical products and health foods such as vitamin preparations.

EXAMPLES

The present invention is further illustrated by the following Examples. However, the present invention is by no means to be construed as being limited to them.

Example 1

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy having a particle size of not more than 200 meshes. The Al—Fe alloy powder (150 g) thus obtained was mixed while stirring for one hr in a 30% (by weight) aqueous sodium hydroxide solution of 50° C., was collected by filtration, was again mixed while stirring for one hr in a 40% (by weight) aqueous sodium hydroxide solution. Subsequently, the mixed solution was allowed to stand, and the upper layer liquid was removed. The residual precipitate was washed with distilled water until pH became 10 or less to obtain a porous Al—Fe alloy powder. In order to avoid contact with oxygen, the porous alloy powder was obtained by a reaction in an aqueous solution.

The porous Al—Fe alloy powder thus obtained was dried in vacuo under conditions of not more than 200 Pa and 80° C. for 2 hr to obtain a dried product of a porous Al—Fe alloy powder. The alloy powder had a bulk density of 0.9 g/cm$^3$ (as measured according to JIS (Japanese Industrial Standards) Z 2504). The porous alloy powder (0.3 g) was packaged in an air-permeable small bag and, together with a desiccant, was placed in a gas barrier bag (an Al foil-laminated plastic bag). The gas barrier bag was filled with 300 mL of air (oxygen concentration: 20.9% by volume), was hermetically sealed, and was stored at 25° C. for one day. The concentration of oxygen within the gas barrier bag after the storage was 11.7%. The amount of oxygen absorbed was calculated from the reduced oxygen concentration in the gas barrier bag and was found to be 100 mL/g.

The mean particle diameter of the porous Al—Fe alloy powder was measured with a particle size/shape distribution measuring device ("PITA-2," manufactured by Seishin Enterprise Co., Ltd.) and was found to be about 31 The specific surface area of the porous Al—Fe alloy powder was measured with an automatic specific surface area measuring device ("GEMINI VII2390", manufactured by Shimadzu Seisakusho Ltd.) and was found to be 100 m$^2$/g.

The porous Al—Fe alloy powder was analyzed by an X-ray analysis with an X-ray diffraction apparatus (RINT-2000, manufactured by Rigaku Corporation) under the following measurement conditions.

Output: 30 kV, 50 mA
Target: Cu(CuKα)
Measurement range: 2θ=10 to 80°

As a result, an X-ray diffraction profile as shown in FIG. 1 was obtained. Characteristics of the porous Al—Fe alloy powder were obtained from the X-ray diffraction profile and, for an diffraction peak at a diffraction angle 2θ=44.46°, were 0.97° for the half value width, 383 (a.u) for the diffraction peak intensity, and 372 for the calculated diffraction peak area ($S_1$). No diffraction peaks were present at diffraction angles 2θ of 11 to 13° and 23 to 25° (that is, diffraction peak areas ($S_2$ and $S_3$)=0).

Reference Example 1

An Al (aluminum) powder (50% by weight) and an Fe (iron) powder (50% by weight) were mixed together and were dissolved in each other in nitrogen to obtain an Al—Fe alloy. The Al—Fe alloy thus obtained was ground with a jaw crusher, a roll crusher, and a ball mill, and the ground product was classified with a net having an opening of 200 meshes (0.075 mm) to obtain an Al—Fe alloy powder having a particle size of not more than 200 meshes. The Al—Fe alloy powder (150 g) thus obtained was mixed while stirring for one hr in a 30% (by weight) aqueous sodium hydroxide solution of 50° C. Subsequently, the mixed solution was allowed to stand, and the upper layer liquid was removed. The residual precipitate was washed with distilled water until pH became 10 or less to obtain a porous Al—Fe alloy powder.

Figure 2:
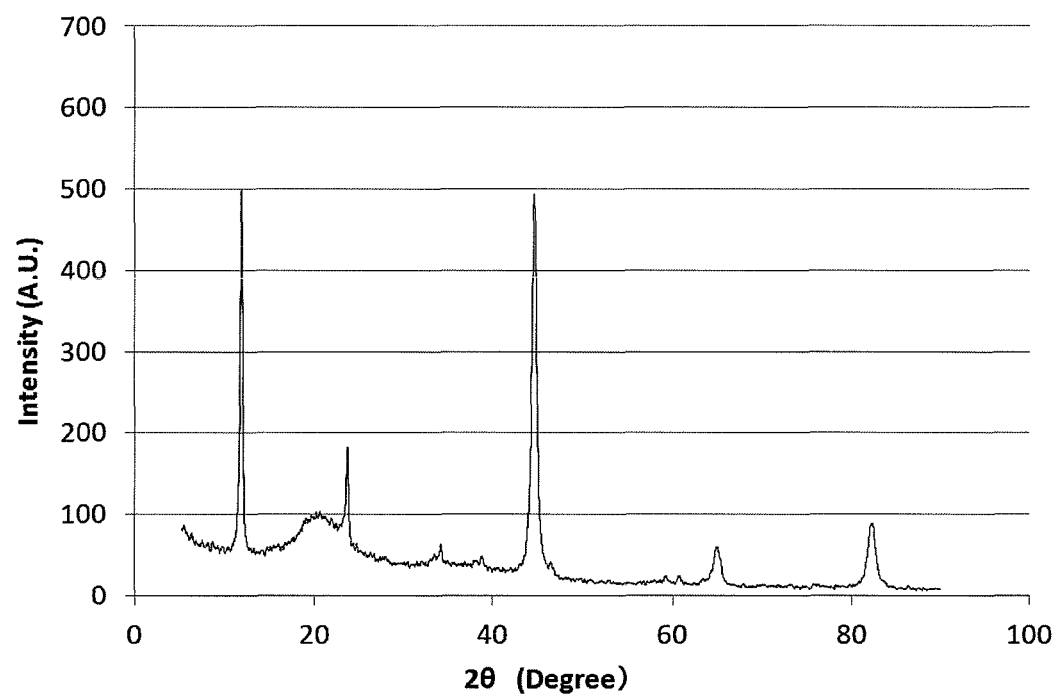
FIG. 2 is a diagram showing an X-ray diffraction pattern of an Al—Fe alloy powder obtained in Reference Example 1.

For the Al—Fe alloy powder thus obtained, the bulk density and the amount of oxygen absorbed, and the specific surface area were measured in the same manner as in Example 1 and were found to be 0.9 g/cm$^3$, 60 mL/g, and 40 m$^2$/g, respectively. Further, the Al—Fe alloy powder was analyzed by an X-ray analysis in the same manner as in Example 1. As a result, an X-ray diffraction profile as shown in FIG. 2 was obtained. Characteristics of the Al—Fe alloy powder were obtained from the X-ray diffraction profile and, for an diffraction peak at a diffraction angle 2θ=44.58°, were 0.56° for the half value width, 541 (a.u) for the diffraction peak intensity, and 303 for the calculated diffraction peak area ($S_1$). Further, for an diffraction peak at a diffraction angle 2θ=11.74°, the half value width of the diffraction peak, the diffraction peak intensity, and the calculated diffraction peak area ($S_2$) were 0.27°, 604 (a.u), and 163, respectively. Furthermore, for an diffraction peak at a diffraction angle 2θ=23.62°, the half value width of the diffraction peak, the diffraction peak intensity, and the calculated diffraction peak area ($S_3$) were 0.36°, 225 (a.u), and 81, respectively.

X-ray diffraction profiles shown in FIGS. 1 and 2 show that, for the porous Al—Fe alloy powder obtained by mixing with stirring for one hr in a 40% (by weight) aqueous sodium hydroxide solution of 50° C. (Example 1), aluminum hydroxide-derived peaks (2θ=11 to 13° and 2θ=23 to 25°) were absent and the alloy powder was substantially free from a metal hydroxide. Further, as compared with the porous Al—Fe alloy powder prepared without mixing with stirring for one hr in the 40% (by weight) aqueous sodium hydroxide solution of 50° C. (Reference Example 1), the porous Al—Fe alloy powder of Example 1 had a larger surface area and had dramatically improved oxygen absorbing properties.

The invention claimed is:

1. An oxygen absorbing agent comprising an alloy powder (Y), the alloy powder (Y) having been obtained by subjecting an alloy powder (X) having a particle diameter in a range of 5 to 200 μm and comprising
   (A) at least one transition metal selected from the group consisting of manganese, iron, platinum, and copper group metals and
   (B) at least one metal selected from the group consisting of aluminum, zinc, tin, lead, magnesium, and silicon
   to treatment with an acid or an alkali aqueous solution to elute and remove at least a part of the component (B) in the alloy powder (X), wherein the specific surface area, as measured by a BET method, of the alloy powder (Y) obtained by eluting and removing at least a part of the component (B) is a least 20 m²/g, and wherein
   the alloy powder (Y) has an X-ray diffraction profile satisfying a diffraction peak relationship of $S_2/S_1<0.3$ wherein $S_1$ represents a diffraction peak area defined by $S_1=W_1 \times I_1$ and $S_2$ represents a diffraction peak area defined by $S_2=W_2 \times I_2$, wherein $W_1$ represents a half value width of a diffraction peak derived from the component (A) and/or a solid solution composed of the components (A) and (B) and $I_1$ represents a diffraction intensity of the diffraction peak; wherein $W_2$ represents a half value width of a diffraction peak at a diffraction angle 2θ of 10 to 11° and $I_2$ represents a diffraction intensity of the diffraction peak.

2. The oxygen absorbing agent according to claim 1, wherein the alloy powder (Y) has an X-ray diffraction profile satisfying a diffraction peak relationship of $S_3/S_1<0.3$ wherein $S_3$ represents a diffraction peak area defined by $S_3=W_3 \times I_3$ wherein $W_3$ represents a half value width of a diffraction peak at a diffraction angle 2θ of 23 to 25° and $I_3$ represents a diffraction intensity of the diffraction peak.

3. The oxygen absorbing agent according to claim 1, wherein the alloy powder (Y) is substantially free from a metal hydroxide that is a hydroxide of the metal as the component (B).

4. The oxygen absorbing agent according to claim 1, wherein the alloy powder (Y) obtained by eluting and removing at least a part of the component (B) has a porous shape.

5. The oxygen absorbing agent according to claim 1, wherein the component (A) is selected from the group consisting of iron, cobalt, nickel, and copper.

6. The oxygen absorbing agent according to claim 1, wherein the component (B) is aluminum.

7. The oxygen absorbing agent according to claim 1, wherein the content of the component (B) in the alloy powder (Y) obtained by eluting and removing at least a part of the component (B) is 0.01 to 50% by weight.

8. The oxygen absorbing agent according to claim 1, wherein the alkali aqueous solution is an aqueous solution of sodium hydroxide or potassium hydroxide.

9. The oxygen absorbing agent according to claim 1, wherein the alloy powder (Y) obtained by eluting and removing at least a part of the component (B) has a specific surface area of at least 40 m²/g as measured by a BET method.

10. The oxygen absorbing agent according to claim 1, which has been obtained by treating the alloy powder (Y) with an additional acid or alkali aqueous solution having a higher concentration than said acid or alkali aqueous solution, and eluting and removing at least a part of the component (B) in the alloy powder (Y).

11. An oxygen absorbing packaged body comprising an oxygen absorbing agent according to claim 1 and a packaging material, the whole or a part of which is formed of an air-permeable packaging material, the oxygen absorbing agent having been packaged into the packaging material.

12. An oxygen absorbing resin composition comprising an oxygen absorbing agent according to claim 1 and a thermoplastic resin.

13. An oxygen absorbing resin sheet or film comprising an oxygen absorbing resin composition according to claim 12.

* * * * *